United States Patent
Li et al.

(10) Patent No.: US 11,197,008 B2
(45) Date of Patent: Dec. 7, 2021

(54) METHOD AND SYSTEM OF CONTENT-ADAPTIVE DENOISING FOR VIDEO CODING

(71) Applicant: Intel Corporation, Santa Clara, CA (US)

(72) Inventors: Yu-Ting Li, San Jose, CA (US); Jong Dae Oh, San Jose, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/586,751

(22) Filed: Sep. 27, 2019

(65) Prior Publication Data
US 2020/0084460 A1   Mar. 12, 2020

(51) Int. Cl.
*H04N 19/196* (2014.01)
*H04N 19/176* (2014.01)
*H04N 19/14* (2014.01)
*H04N 19/137* (2014.01)

(52) U.S. Cl.
CPC ......... *H04N 19/198* (2014.11); *H04N 19/137* (2014.11); *H04N 19/14* (2014.11); *H04N 19/176* (2014.11)

(58) Field of Classification Search
CPC .... H04N 19/198; H04N 19/137; H04N 19/14; H04N 19/176
See application file for complete search history.

(56) References Cited

U.S. PATENT DOCUMENTS

| | | |
|---|---|---|
| 2009/0167951 A1* | 7/2009 | Chiu ............... H04N 5/21 348/607 |
| 2011/0235941 A1* | 9/2011 | Hamada ............ H04N 5/21 382/275 |
| 2013/0251282 A1* | 9/2013 | Min ................. G06T 5/50 382/260 |
| 2015/0279006 A1* | 10/2015 | Choi ............... G06T 5/002 382/264 |
| 2015/0379693 A1* | 12/2015 | Novotny ........... H04N 5/142 348/625 |
| 2018/0343448 A1* | 11/2018 | Possos ........... H04N 19/117 |
| 2019/0188829 A1* | 6/2019 | Wei ............... H04N 19/573 |
| 2020/0027202 A1* | 1/2020 | Oh ................. G06T 5/002 |

* cited by examiner

*Primary Examiner* — Rowina J Cattungal
(74) *Attorney, Agent, or Firm* — Essential Patents Group, LLP.

(57) ABSTRACT

Methods, articles, and systems of denoising for video coding using content-adaptive temporal and spatial filtering.

25 Claims, 11 Drawing Sheets

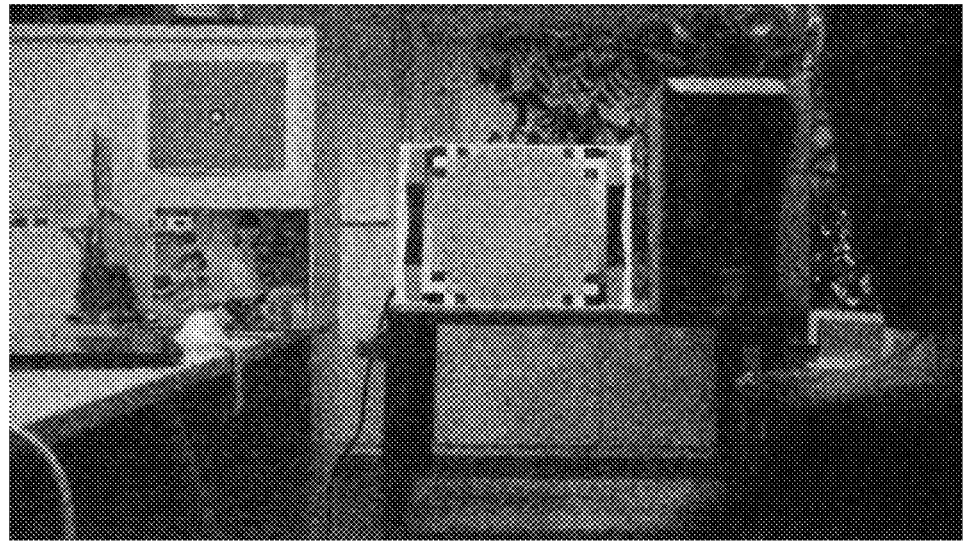

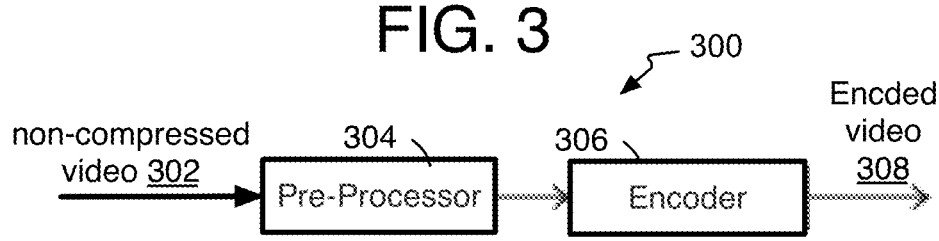
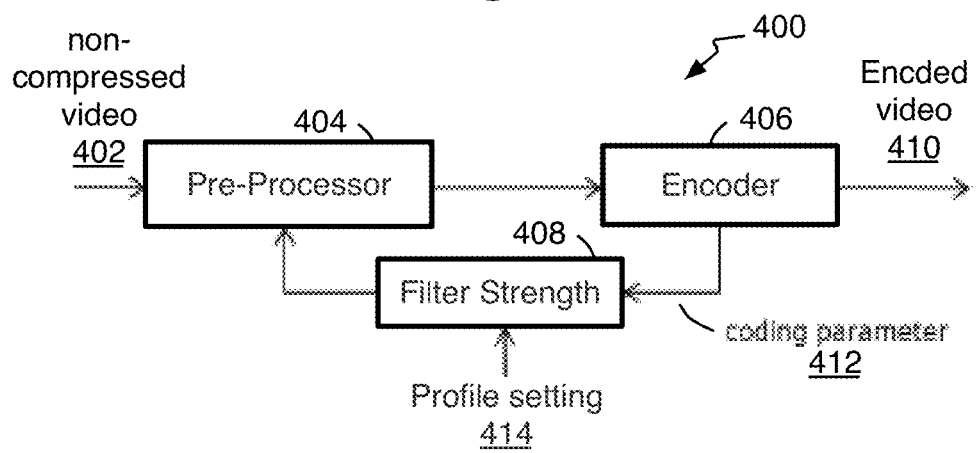
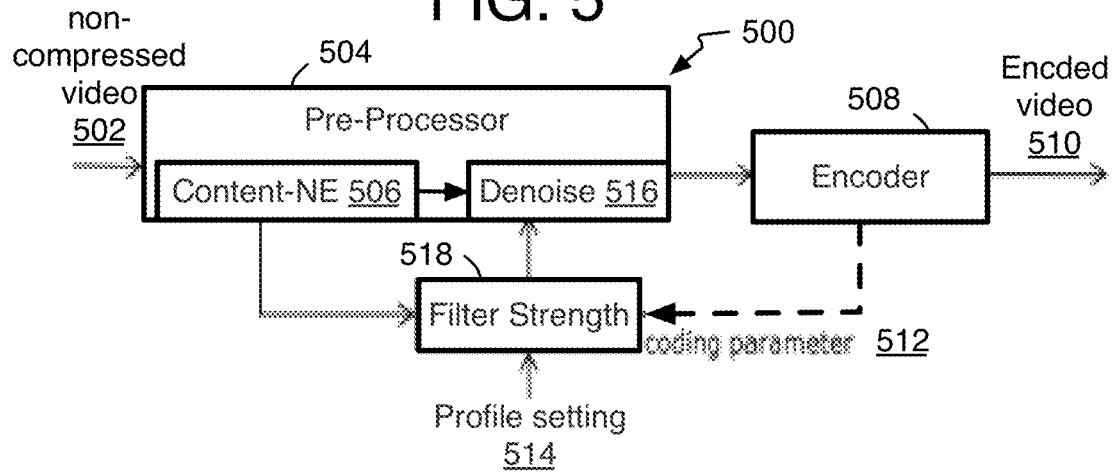

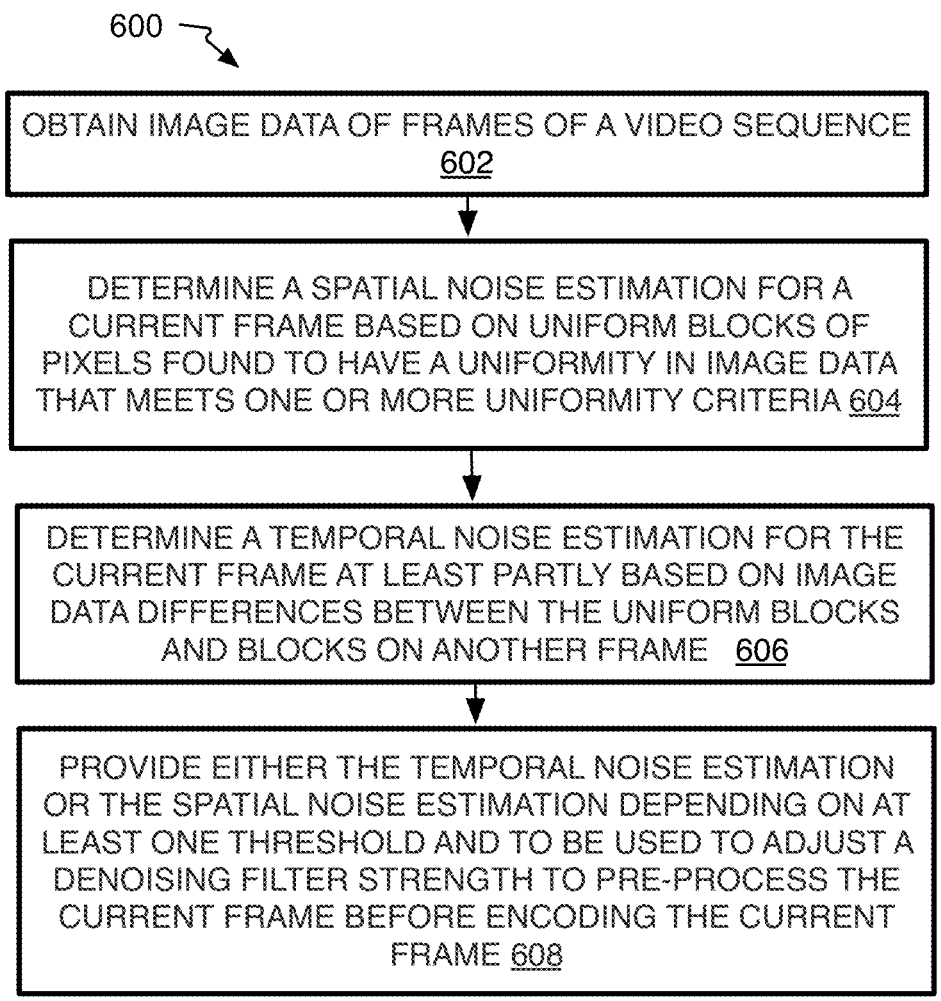

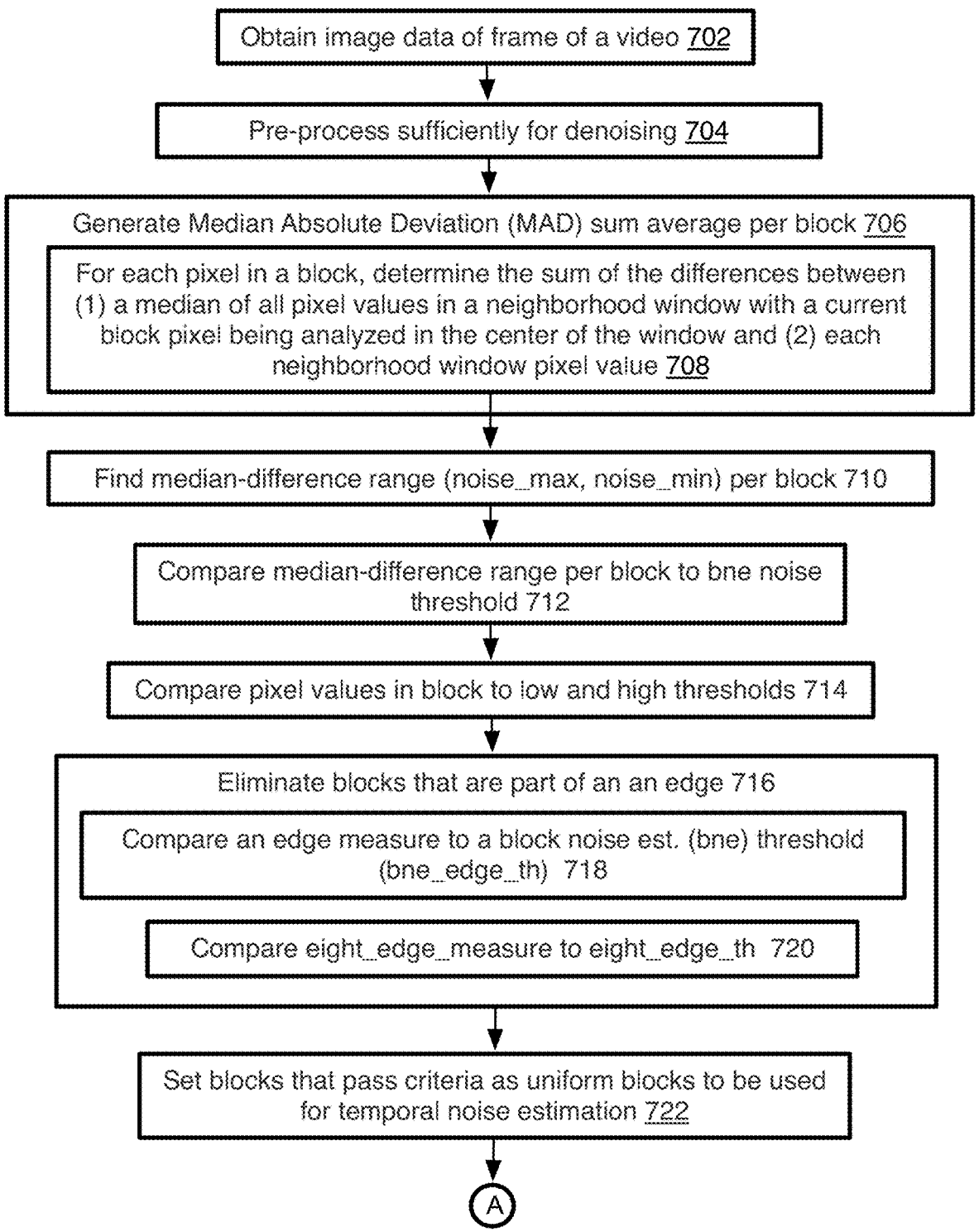

METHOD AND SYSTEM OF CONTENT-ADAPTIVE DENOISING FOR VIDEO CODING

BACKGROUND

As video coding and streaming of videos becomes more commonly used, the demand for high quality video keeps growing as well. In the coding process, where a video stream is encoded, transmitted to a remote computing device, and decoded, certain pre-processing operations are performed before encoding to better ensure the quality of the resulting decompressed and displayed images of a video. This may include performing denoising before a video is to be encoded or compressed for transmission to another device. Denoising relates to the removal of noise from images in the form of unwanted dots or speckle that can cloud or blur an image as well as discoloration or luminance errors where the pixels have the wrong image values. This may occur due to poor lighting and/or malfunctioning or low quality camera sensors or other camera equipment.

To perform the denoising, a noise estimation technique may be used that estimates the noise to identify and subtract the noise from the image to be encoded. These techniques, however, often are inadequate because frame to frame motion of image content and complex image content interfere with the ability to identify and smooth or remove a significant amount of random fluctuation in pixel values.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures:

FIG. 1 is an image showing results of an underestimated noise level;

FIG. 2 is an image showing results of an overestimated noise level;

FIG. 3 is a schematic diagram of a conventional video coding system;

FIG. 4 is a schematic diagram of another conventional video coding system;

FIG. 5 is a schematic diagram of a video coding system with noise estimation according to at least one of the implementations herein;

FIG. 6 is a flow chart of a method of content-adaptive denoising for video coding according to at least one of the implementations herein;

FIGS. 7A-7C is a detailed flow chart of a method of denoising for video coding according to at least one of the implementations herein;

DETAILED DESCRIPTION

Figure 7B:
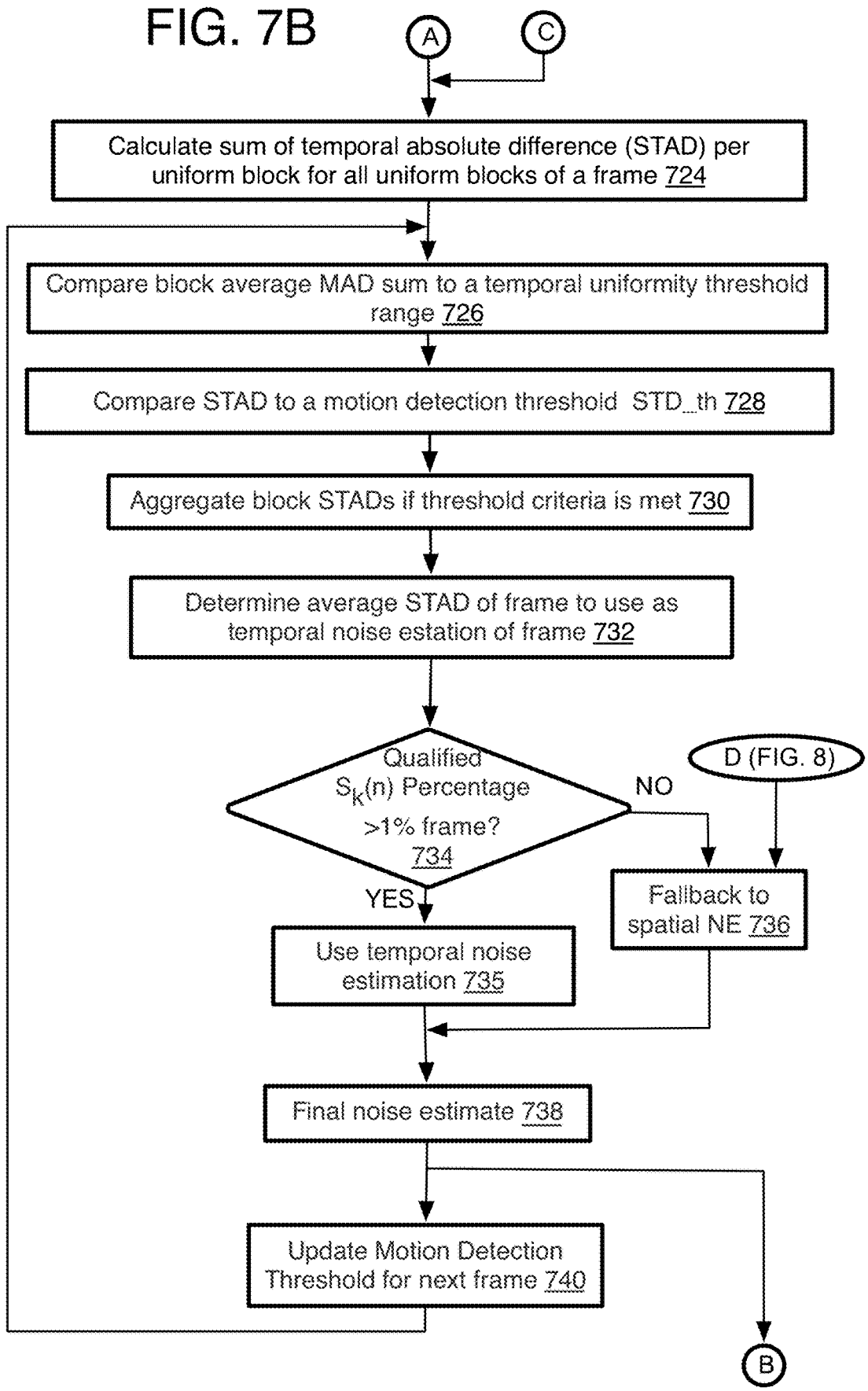

One or more implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, tablets, mobile devices, computers, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Furthermore, when a particular feature, structure, or characteristic is described in connection with an implementation, it is submitted that it is within the knowledge of one skilled in the art to affect such feature, structure, or characteristic in connection with other implementations whether or not explicitly described herein.

Systems, articles, and methods are described below that relate to content-adaptive denoising for video coding according to the implementations herein.

Denoising as part of pre-processing before encoding a video attempts to increase the coding gain (signal-to-noise (SNR) ratio of an original video versus the coded video) thereby increasing the quality of the video. Techniques that simply remove certain image data pass levels, such as outliers, have proven inadequate. Thus, both software and/or hardware techniques have been developed that provide identifiable noise estimation so that image values that match the identified noise can be removed or smoothed-out in the image.

Referring to FIGS. 1-2, the conventional noise estimation techniques, however, are typically based on single image noise estimation, which tends to underestimate noise level of heavy-noise content captured from low-quality devices and under low-light environment. The noise estimation by one conventional system is shown in image 100 with a low noise estimation where massive temporal fluctuation resulted such that the noise level estimated from a single image does not reflect the noise level perceived by a human visual system and results in a poor quality image. An image 200 shows the results of this conventional system when noise estimation of an image with a perceptually low (nearly clean) noise level overestimates and detects a high noise level of the video content anyway with rich texture for example. Other software estimation techniques may provide better results but often competes with other central processing unit (CPU) resources due to the heavy computational load noise estimation.

Referring to FIG. 3, a conventional video coding system 300 is shown that provides non-compressed video 302 to a pre-processor 304 that performs de-noise techniques including conventional noise estimation as mentioned. The de-noised video frames are provided to an encoder 306 for encoding thereby forming encoded video output 308.

Referring to FIG. 4, in another conventional technique, the quantization parameter (QP) used during encoding is also used to set the filter strength for denoising during pre-processing of images. The higher the QP, the lower the quality of the image that is expected, the stronger the filter weights can be set to remove a greater amount of noise form the image. Thus, a conventional video coding system 400 is shown with input non-compressed video 402 provided to a noise estimating pre-processor unit 404, which provides denoised image data to an encoder 406 that uses the QP and outputs encoded video 410. The coding parameter (the QP) 412 is provided to a filter strength unit 408 before an image is provided to the encoder 406 so that the QP as well as a profile setting 414 can be used to adjust a filter strength. The profile setting 414 sets the filter strength for particular image characteristics such as low, medium, or high noise level. The filter strength setting is then provided to the pre-processor to perform the denoising along with noise estimation when being performed to identify and remove known noise.

Other noise estimation techniques do determine a temporal noise estimation by using multiple frames, but these techniques are still computationally heavy since all pixels of an image are analyzed, and are still inaccurate since it captures much fluctuation from motion and complex content and erroneously identifies such changes as noise.

To resolve these issues, a method and system disclosed herein improves or maintains subjective visual quality while achieving increased coding gain compared to the conventional denoising systems for pre-processing before encoding video frame image data. This is accomplished by using content-adaptive denoising, and involves determining a spatial noise estimation by identifying pixel blocks in a frame that have sufficiently uniform (or flat or homogenous) image data that tends to avoid complex and motion image data that can easily be mistaken for noise. The uniform blocks, rather than all blocks in the frame, are then used to form the spatial noise estimation, and particularly by using median difference values of the blocks to form the spatial estimations.

By one form, a temporal noise estimation also is formed by using differences in image data from frame to frame and again only by using the uniform blocks to form the estimation, thereby smoothing or removing random fluctuations in noise from frame to frame. Specifically, in order to estimate noise level temporally to reflect random noise fluctuation, consecutive (or other) pairs of frames may be used to estimate the noise level. The uniform or homogenous blocks are selected based on statistical measurements to better ensure that blocks without complex textures and details are included in the noise estimation calculation, thereby avoiding the inclusion of intensity variations from frame to frame due to complex image content. The spatial or temporal noise estimation then may be used to adjust a denoising filter strength for denoising during pre-processing for encoding and depending on at least one performance criterion for example. Since the filter strengths are derived adaptively based on content type, overall coding gain can be improved.

Specifically, with better noise estimation results obtained from noisy but less complex and static image data, the improved estimated noise level better indicates a noise filtering strength to detect noise on blocks of both static and non-static image content, and both complex and simple image content. This improves the smoothing out of random fluctuations in pixel values during pre-processing before encoding an image. The noise filtering strength is thereby content-adaptive because it is derived from the estimated noise levels based on the uniform blocks, thereby providing enhanced Global Noise Estimation (GNE) in video denoise (VDN) filtering to identify noise levels of video content, and may be considered to better reflect the noise level perceived by a human visual system.

Referring to FIG. 5, an example video coding system 500 receives non-compressed video input 502 from a decoder, memory or other source, and provides image content, which may be raw image content, to a pre-processor unit 504 that formats the image data for encoding. The pre-processing may include the content-adaptive denoising disclosed herein and performed by a content noise estimation (content-NE) unit 506 and denoising unit 516. The pre-processed image data is then provided to an encoder 508 to output encoded video 510 for transmission to remote decoders for example. The system 500 may perform the content adaptive denoising by first having the content-NE unit 506 determine uniform bocks of an image and then use those blocks to determine spatial and temporal noise estimations. At least one of the noise estimations are then provided to a filter strength unit 518 that may or may not be considered part of the pre-processor unit 504. The filter strength unit 518 may use the noise estimations and optionally a profile setting 514 as well as an optional coding (QP) setting 512 from the encoder 508 to set the filter strength. Denoising control logic may obtain analytic information from both the pre-processor unit 504 and encoder 508 as input for setting content-adaptive and coding-aware pre-processing strength. The filter strength is then provided to a denoising unit 516 to set the filters by adjusting filter weights according to the filter strength setting, and then to perform the filtering to denoise an image. Other details as well as experimental results comparing the system of 500 to the conventional system 400 are provided below.

Referring to FIG. 6, an example process 600 of content-adaptive denoising for video coding is arranged in accordance with at least some implementations of the present disclosure. In the illustrated implementation, process 600 may include one or more operations, functions or actions as illustrated by one or more of operations 602 to 608 numbered evenly. By way of non-limiting example, process 600 may be described herein with reference to example systems 500 or 900 of FIG. 5 or 9 respectively and as discussed herein.

The process 600 may include "obtain image data of frames of a video sequence" 602, and this may include obtaining non-compressed image data either from a decoder for re-encoding the image data such as at a transcoder, or could be raw image data obtained from a camera. Whether raw or with some format processing, the image data may be obtained from a memory. By one form, this also may include pre-processing the image data at least sufficiently for denoising such as being demosaiced and so forth.

The process 600 may include "determine a spatial noise estimation for a current frame at least partly based on uniform blocks of pixels found to have a uniformity in image data that meets one or more uniformity criteria" 604. This operation involves first determining whether blocks on a current image are considered sufficiently uniform to avoid changes in complex content in the blocks that could erroneously be considered noise. This is determined by using median differences with pixel image data values, such as intensity or luminance values. By one example, for each pixel in a block, and similar to a median absolute deviation (MAD), a difference between a median of pixel values within a neighbor window of the block pixel and each pixel value within the neighbor window are summed. Thus, the differences are summed to provide a single median difference sum for the block pixel, and this is repeated for each pixel in a block. The median sum (or median difference sum) for each pixel is then averaged to provide a block average MAD sum for each block. The median difference sums in a block are then analyzed to determine if these sums are within a uniformity range, and pixel values are compared to a threshold range as well. The image data of the block also is analyzed to determine whether an edge of an object is detected in the content of the block. This may be performed by using edge detection algorithms. If these criteria are met and the block does not have edge content, then the block is deemed at least initially as a uniform block. To be sufficiently uniform for inclusion in the spatial noise estimation generation, a further test may be used where the smallest MAD sum of a block pixel and within a candidate uniform block should be less than a spatial noise threshold. IN this case, the average of the block average MAD sums is the spatial noise estimate. Otherwise, a further test is performed comparing the block average MAD sums to a further uniformity range for a block to be sufficiently uniform for temporal noise estimation generation.

The process 600 may include "determine a temporal noise estimation for the current frame at least partly based on image data differences between the uniform blocks and blocks on another frame" 606. Here, for each block found to be a uniform block, a difference in image data between the current frame and another frame, such as a previous frame, is determined such as by computing a SAD or STAD for the block. The STAD of each block is then compared to one or more thresholds to ensure that too much motion or complexity image content is avoided. One of the thresholds is a motion detection threshold STAD_th(n) that is a weighted-average of a previous-frame's motion detection threshold and a previous-frame's estimated noise level. The number of uniform blocks that pass these criteria (qualified blocks) is divided by the total number of uniform blocks on the frame eligible for temporal noise estimation to obtain a percentage of the qualified uniform blocks that pass the threshold. This percentage indicates how many blocks are uniform noise blocks with little or no motion. If the percentage of qualified uniform blocks is greater than a temporal percentage threshold, then a temporal frame noise estimation may be used to set filter strength. In this case, the average of the qualifying STADS that pass the thresholds is the frame temporal noise estimation to be used. When a threshold minimum percentage of STAD qualifying uniform blocks is not obtained, then the frame spatial noise estimation is to be used for filter strength adjustment instead.

The process 600 then may include "provide either the temporal noise estimation or the spatial noise estimation depending on at least one threshold and to be used to adjust a denoising filter strength to pre-process the current frame before encoding the current frame" 608. As mentioned, at least the temporal or spatial noise estimation is to be used to set a filter strength. The filter strength is then used to filter the current frame during pre-processing to prepare the current frame for encoding.

Figure 7C:
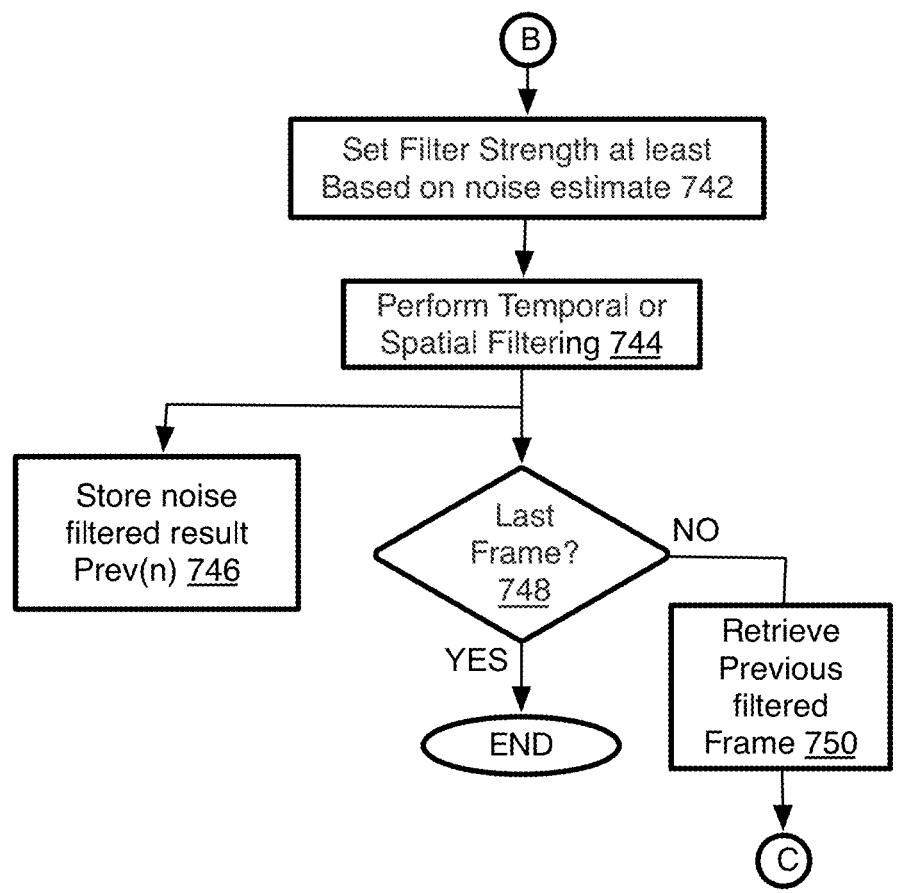

Referring to FIGS. 7A-7C, an example process 700 of content-adaptive denoising for video coding is arranged in accordance with at least some implementations of the present disclosure. In the illustrated implementation, process 700 may include one or more operations, functions or actions as illustrated by one or more of operations 702 to 750 generally numbered evenly. By way of non-limiting example, process 700 may be described herein with reference to example systems 500 or 900 of FIG. 5 or 9 respectively and as discussed herein.

The process 700 may include "obtain image data of a frame of a video" 702, and as mentioned above with process 600, this may be non-compressed image data obtained from a decoder, a memory with raw image data from one or more camera sensors, from other sources or memory, and so forth, and then to be encoded.

The process 700 may include "pre-process sufficiently for denoising" 704, and this includes pre-processing sufficiently to perform the denoising. This may include Bayer demosaicing, and other pre-processing techniques. Once the denoising is complete for an image for encoding, then other encoder pre-processing techniques may be applied such as image pixel linearization, shading compensation, resolution reduction, vignette elimination, image sharpening, and so forth. These techniques may be applied after the denoising and before providing the image data to an encoder. This is assumed below and will not be mentioned again.

Figure 7D:
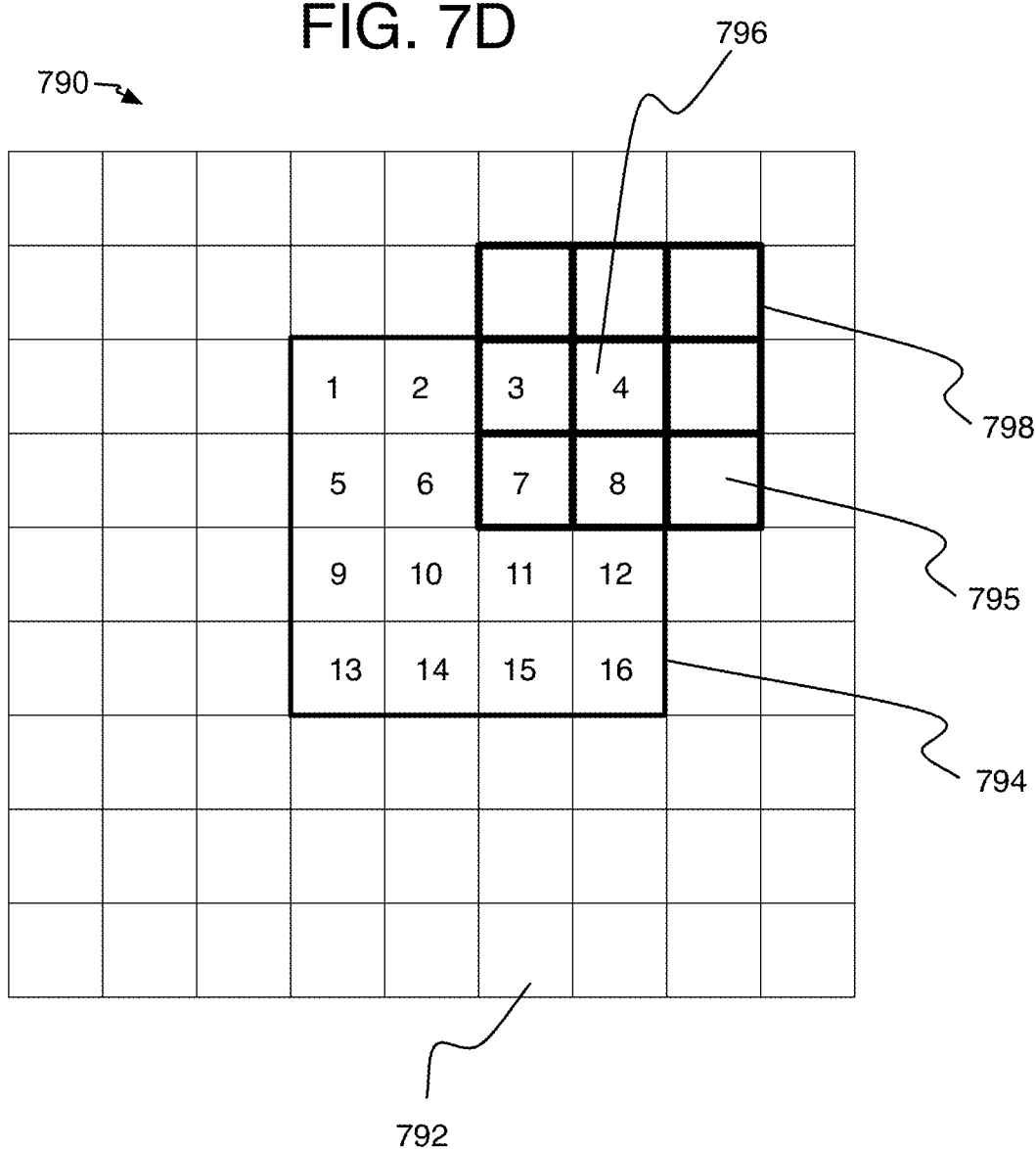
FIG. 7D is a schematic diagram to explain median absolute deviation sums according to at least one of the implementations herein.

The process 700 may include "generate median absolute deviation (MAD) sum average per block" 706. Thus, the proposed noise estimation mechanism utilizes median absolute deviation (MAD) type of values. This may start with "for each current pixel in a block, determine the sum of the differences between (1) a median of all pixel values in a neighborhood window with a current block pixel being analyzed in the center of the window and (2) each neighborhood window pixel value" 708. Referring to FIG. 7D, a portion of a grid or 2D array 790 of pixels 792 forming a frame in a video sequence shows how a MAD sum can be determined for each pixel 796 in a block of pixels 794 here numbered 1 to 16 for a 4×4 block. The MAD sum is the sum of the absolute difference of the median image date value in a neighborhood window 798 around the pixel 796 and image data value of each neighborhood window pixel 795 in the neighborhood window 798. For a conventional MAD determination, the median value of these median differences is taken as the output. Here, however, the MAD sum is the sum of these differences in the neighborhood window 798 instead, and is therefore referred to as a MAD sum rather than just a MAD. By one form, the MAD sum is computed for each 3×3 neighborhood window 798 for 9 pixels, although other sizes could be used. The window 798 is located by placing each pixel of the block 794 at the center of the neighborhood window 798. The average MAD sum of all pixels 796 in the block 794 is then used as the uniformity measure of the block 794. This can be provided by the following equation:

$$MAD_{ave-sum-k} = \Sigma_{p=0}^{P}(MAD\ Sum)_p/P = \Sigma_{p=0}^{P}(\Sigma_{np=0}^{P}M_p - I_{np})_p/P \quad (1)$$

where for a block k, the neighborhood window is positioned so that each pixel p from 1 to P in a block k is placed in the center of the neighbor window 798. np is pixel count or position with 1 to NP pixels in the neighborhood window 798. $M_p$ is the median image data value (such as intensity value) for the pixel p and of the np pixels in the neighborhood window 798 where each neighborhood window pixel np has an intensity (or brightness or luminance) value $I_{np}$. It should be noted that the MAD sum could be computed for chroma planes as well as an intensity plane. The block k 794 is shown here as being 4×4 for explanatory purposes but may actually be 8×8, 16×4, 16×16 macroblock size, 32×32, 64×64, or other desirable sizes.

The average MAD sum ($MAD_{ave-sum-k}$) or block average MAD sum of a block 794 may be referred to as the block noise estimation (bne) in the discussion below or sigma_avg in the pseudo code provided below. The block average MAD sum may be computed by dividing the sum of each pixel median difference sum by the number of pixels P in the block. By one form, it is shown in Pseudo code as:

sigma=sigma_sum>>shift;//shift=(chroma)?3:4 (2)

which refers to a bit shift to perform the division and by using 3 for a chroma block and 4 for a luma block.

Thereafter, the process 700 may include "find median-difference range (noise_max, noise_min) per block" 710, and while the median differences are being summed to compute the block average MAD sum, the method can track the difference values and determine the highest median difference sum (noise_max) and lowest median difference sum (Noise_min) for a block to set a median-difference range per block. Then, the process 700 may include "compare median-difference range per block to bne noise threshold" 712, where a threshold is determined by experimentation to set a sufficiently uniform range to establish a uniform block. This ensures the block average homogeneity (block average MAD sum) among all pixels in the block is found to be within a threshold range. By one possible example, the range limit may be 0 to 255 (×8 when the input is 8 bit).

Next, the process 700 may include "compare pixel values in block to low and high thresholds" 714, and to compare pixel intensity (or chroma) values to thresholds ValidPixel-LowThreshold and ValidPixelHighThreshold to exclude pixels that are too dark or too bright, or in other words outliers, that could undesirably have too much influence on a frame noise estimation. These pixel thresholds also may be determined by experimentation.

For those blocks with a range of median sums within a threshold range and with pixel values within the pixel thresholds, these blocks are considered sufficiently uniform so far and are then tested to determine if the block contains an edge in its image content. Otherwise, the block is dropped as not being sufficiently uniform.

Then, process 700 may include "eliminate blocks that are part of an edge" 716. Here, the image data, such as intensities (or chroma values) of the block average MAD sum also may be compared to edge detecting thresholds that tend to indicate that the MAD is part of an edge rather than a more uniform part of an object in an image. By one approach, this may include two different edge threshold tests, a single Sobel edge detection test and an eight edge detection test, although other tests could be used. Both tests are used here because horizontal and vertical edges may be detected better by Sobel edge detection while other diagonal edges may be better detected by the eight directional edge detection technique.

To perform these edge tests, the process 700 may include "compare an edge measure to a block noise est. (bne) threshold (bne_edge_th)" 718, and to perform the Sobel edge detection for the pixels in a block that is considered to be a uniform block that has met the other criteria so far. The Sobel edge detection is a known technique. For the second test, process 700 may include "compare eight_edge_measure to eight_edge_th threshold" 720, which also is a known technique for detecting edges. The thresholds are determined by experimentation, and if both tests are not passed, the block is considered to have edge content and is dropped.

The process 700 may include "set blocks that pass criteria as uniform blocks to be used for temporal noise estimation" 722 and this may be performed by setting a flag or bit number for each block in memory or on a table for example that indicates at least initially the block is considered a uniform block so far, although both spatial and temporal noise estimation generation provide further uniformity tests as described below before using the data of the block for the noise estimation.

Otherwise, the uniform blocks also may be used to generate a frame spatial noise estimate that can be used in the alternative to a temporal noise estimate generated below. The generation of the spatial noise estimate is handled by process 800 (FIG. 8) described below.

Continuing now with the temporal portion of process 700, the process 700 may include "calculate sum of temporal absolute difference (STAD) per uniform block for all uniform blocks of a frame" 724. Once the block is determined to be a uniform block by passing the criteria mentioned above, then temporal noise estimation can be calculated for this uniform block. A block-level temporal noise estimation metric is calculated from sum of temporal absolute difference (STAD), computed the same way as a sum of absolute difference (SAD), between corresponding blocks on two frames, and by one form, temporally-adjacent blocks on the two frames, which may be consecutive frames including the current frame and a previous frame. By one form, the two frames are a current frame (n) and a consecutive previous filtered frame (n−1) but other variations could be used as well such as current and future frame, and three frames (current, previous, and future frames). For each uniform block so far, the STAD may be calculated as:

STAD=$\Sigma$|curr_blk(x,y)−prev_blk(x,y)| (3)

where curr_blk is the current block, prev_blk is a corresponding block on a previous frame relative to the current block and at the same coordinates on the frame, and (x, y) are the same pixel coordinates on both frames. The result is a block STAD (or STAD $S_k(n)$) obtained for each block k.

The process 700 then may include "compare block average MAD sum to a temporal uniformity threshold range" 726. For a preliminary spatial uniformity test then, the block average MAD sum may be obtained for each initially uniform block to be compared to one or more uniformity thresholds to determine if the block is sufficiently flat or uniform (or homogeneous) for temporal noise estimation. This further eliminates blocks with complex intensity (or color) spatial patterns that indicates complex content with random undesirable image data variations that can appear as noise and erroneously affect the resulting noise estimation. Thus, the block average MAD sum of a block may be compared to upper and lower thresholds (low_th and hi_th) in order to eliminate blocks that are not sufficiently uniform for temporal noise estimation. Those blocks with a block average MAD sum that are within the spatial uniform thresholds here are considered sufficiently uniform for temporal noise estimation.

The process 700 then may include "compare STAD to a motion detection threshold STAD_th" 728. Particularly, the STAD of a block cannot be used to form a temporal noise estimation yet because the STADs also can be heavily influenced by high noise levels or may be caused by large local and/or global motion and/or scene changes. Thus, in order eliminate blocks with STADs that are a result of scene changes, motion, or high noise levels, an adaptive motion detection threshold STD_th may be applied and may be adaptively adjusted depending on a previous frame's estimated noise metric.

Specifically, a motion detection threshold should clamp the STAD values which are exceeding this threshold by resetting the value of the STAD at the threshold values. If just an empirical threshold value is used for the STAD threshold, such threshold may clamp the STAD value due to motion for low-level noise video. However, since the conventional systems do not change this threshold, the STAD clamp is also used as a high-level noise video threshold that is often too low. Thus, instead of using a pre-set threshold for all types of content to clamp large STAD values, which may not be suitable for all types of content, the motion detection threshold here STAD_th is content adaptive since the threshold is a weighted-average of a previous motion detection threshold STAD_th and a previous-frame's calculated global noise estimation (GNE) value. The threshold STAD_th indicates blocks with little or no motion.

Thus, equation (4) below defines the weighted-average of a previous-frame's motion detection threshold and a previous-frame's estimated noise level while using a weight or scale factor to balance the influence of the previous temporal noise estimation (which is the average STAD of the previous frame) and the previous STAD threshold to attempt to reduce the amount of motion or maintain a low amount of motion in the uniform blocks to be used to generate a temporal noise estimation for the current frame. Here, the scale factor sf is set to 1 and an sf_normalizer is set to 2 by this example. The scale factor can be set by experimentation. The threshold STAD_th also avoids factoring large motion into the calculation because presumably the noise level will not change suddenly from frame to frame even when a large amount of motion is occurring. The equation for the STAD_th threshold is as follows.

$$STAD\_th(n) = (STAD\_th(n-1) + (GNE\_value(n-1) << sf))/sf\_normalizer \quad (4)$$

where n is a frame index number, Curr(n) is the current video frame with frame index n, and the GNE_value (n−1) is the noise estimation of the previous frame that was used for filter strength adjustment. This noise estimation could be either the spatial or temporal noise estimation of the previous or earlier frame. This may be considered conditioning the aggregation of the uniform blocks by only including those blocks that meet the motion detection threshold.

Thereafter, the process 700 may include "aggregate block STADs if threshold criteria is met" 730 so that all uniform blocks that passed both the temporal block average MAD sum range threshold and the motion detection threshold (referred to as the qualifying blocks) can be included in the temporal motion estimation for the current frame. Here the STADs of all qualifying blocks are summed for the averaging computation.

Process 700 then may include "determine average STAD of frame to use as the temporal noise estimation of the frame" 732, where the STAD sum is divided by the number of qualifying uniform blocks here. Thus, the denoising method averages all block-level STADs (referred to as block-level noise metrics) on all of the qualified uniform blocks to obtain a frame-level temporal noise metric for the frame.

The process 700 then continues to determine whether the temporal or spatial noise estimation should be used to adjust the filter strength for the denoising of the current frame. Thus, process 700 may include the inquiry "qualified $S_k(n)$ percentage >1% frame?" 734. By one form, the percentage indicates a percentage of uniform blocks which pass all the uniformity and low motion temporal conditions up to operation 730 relative to a total number of blocks in a frame, such as 4×4 blocks that are the same size as the uniform blocks. By an alternative, the number of qualifying uniform blocks on the current frame is divided by the total number of uniform blocks on the current frame that were initially provided by the spatial block noise estimation and that were initially considered uniform blocks for temporal noise estimation before any of the temporal threshold comparisons. This may be either before or after operation 726 testing the block average MAD sums of the uniform blocks. The computed fraction is the percentage that is compared to the threshold percentage, which is set at about 1% for the examples herein. The threshold percentage may be determined by experimentation.

When the actual qualifying uniform block percentage is above the threshold percentage, then the process 700 may include "use temporal noise estimation" 735 as the final noise estimate 738 to adjust the filter strength 742. There are different filter strengths. For example, if noise level is high (GNE value is high), more neighbor information should be used than the current pixel. To accomplish this, a higher weight is provided to the neighbor pixels and less weight is placed on the current pixel. Thus, as mentioned, the filter strength also may be set by using a profile setting as well as image quality setting by obtaining the QP from the encoder for the current frame, and where the higher the QP, the poorer the image quality, and a stronger filter weight is used, and vice-versa.

However, when the actual qualifying uniform block percentage is below the threshold percentage, then the process 700 may include "fallback to spatial noise estimation" 736 to adjust the filter strength, and is computed by process 800 (FIG. 8) using many of the spatial operations described above to provide spatial block noise estimates (the block average MAD sums). Otherwise, once the spatial noise estimation is generated, the remaining operations are the same as that of using the temporal noise estimation to adjust the filter strength.

Whichever noise estimation is selected, the process 700 then may include "perform temporal or spatial filtering" 744, where the denoising unit will determine which type of filtering to perform based on known factors, and is not limited by whether a spatial or temporal noise estimation was provided. Thus, by one form, these are separate considerations.

Then, the noise filtered result may be stored 746 to provide a previous frame and to provide the frame for encoding. An inquiry may be performed to determine if there are more frames 748, and if not, the process ends. If so, the process retrieves 750 the image data of a previous filtered frame for the next temporal computations, and loops back to operation 724 to perform the temporal operations on the next frame when the next frame's uniform blocks (so far) are provided from operations 702 to 722 which is repeated for each new frame. Also, the motion detection threshold of the current frame is updated 740 as the previous frame motion detection threshold for the temporal computation of the motion detection threshold for the next frame at operation 726 as well.

Figure 8:
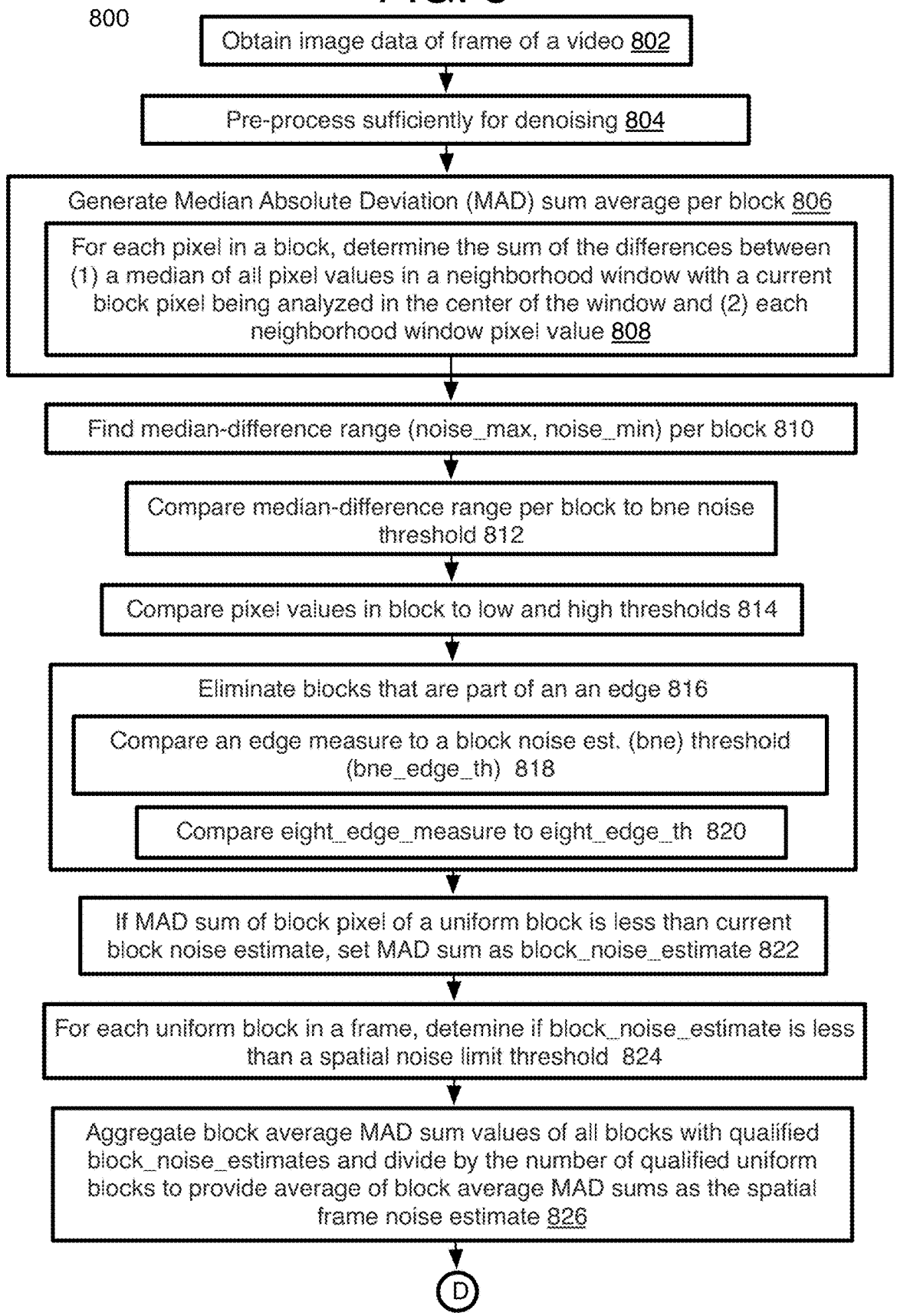
FIG. 8 is a flow chart of spatial noise estimation generation for the method of FIGS. 7A-7C according to at least one of the implementations herein.

Referring to FIG. 8, a process 800 generates a fallback frame spatial noise estimation that provides the spatial noise estimate to operation 736 of process 700. For this process 800, the same spatial operations 702 to 720 are performed here as operations 802 to 820 to generate block average MAD sums, and need not be described in detail here again.

Thereafter, process 800 may include "if MAD sum of block pixel of a uniform block is less than a current block noise estimate, set MAD sum as block_noise_estimate" 822. This is repeated for each uniform block so far, and is performed to set the smallest median-pixel sum difference in the block as the minimum noise estimate. This is performed because the smallest median difference in a block that is too large still may indicate that the block is not sufficiently uniform.

Thus, the process 800 then may include "for each uniform block in a frame, determine if block_noise_estimate is less than a spatial noise limit threshold" 824. The spatial noise limit threshold is determined based on experimentation, and as mentioned, tests whether differences are too large in a block and is more likely to have non-uniform image data values in the block.

The process 800 may include "aggregate block average MAD sum values of all blocks with qualified block_noise_estimates and divide by the number of qualified uniform blocks to provide average of block average MAD sums as the spatial frame noise estimate" 826, Example Suedo Code:

```
SPATIAL NOISE ESTIMATION
// (a1)
for each pixel in a 16×4 block{
    median9 = median of the 3×3 neighbor
    for each neighbor within a 3×3 region{
        med_diff = |neighbor-median9|;//MAD of current pixel
        if(med_diff > noise_max)
            noise_max = med_diff;
        if(med_diff < noise_min)
            noise_min = med_diff;
        sigma += med_diff;
    }
    min_max_diff = noise_max - noise_min;
    edge_measure = SobelEdgeDetector;
    if ((edge_measure < bne_edge_th) && (min_max_Diff < bne_noise_th) &&
        (eight_edge_measure < eightEdge_th) && ((pixel > ValidPixelLowThreshold) &&
        (pixel < ValidPixelHighThreshold)) && (sigma < block_noise_estimate))
            block_noise_estimate = sigma;
}
// (a2)
for each 16×4 block in a frame{
    if(block_noise_estimate < limit)
        aggregate all qualified block_noise_estimate // ☐ spatial noise metric
}
TEMPORAL NOISE ESTIMATION
// (b1)
for each pixel in a 4×4 block{
    median9 = median of the 3×3 neighbor
    for each neighbor within a 3×3 region{
med_diff = |neighbor-median9|;//MAD of current pixel
    if(med_diff > noise_max)
        noise_max = med_diff;
    if(med_diff < noise_min)
        noise_min = med_diff;
sigma += med_diff;         //[block pixel sum (neighbor window sum/pixel)]
    }
    min_max_diff = noise_max - noise_min;
        edge_measure = SobelEdgeDetector;
    if ((edge_measure < bne_edge_th) && (min_max_Diff < bne_noise_th) &&
    (eight_edge_measure < eightEdge_th) && ((pixel > ValidPixelLowThreshold) && (pixel <
    ValidPixelHighThreshold)))
        sigma_sum += sigma;     //[sum of all block pixel sums to compute average for a block]
    else
      skip this block;
sigma_avg = sigma_sum >> shift; //shift = (chroma) ? 3: 4       //[block ave MAD sum]
// (b2)
```

```
for each 4×4 UNIFORM block in a frame{
  STAD = Σ|curr_blk(x,y)−prev_blk(x,y)|
    if(sigma_avg >= low_th1 && sigma_avg < hi_th1 && STAD < STAD_th)
      aggregate all qualified STAD1;
    if(sigma_avg >= low_th2 && sigma_avg < hi_th2 && STAD < STAD_th)
      aggregate all qualified STAD2
}
// (b3) for the entire frame
if(percentage_qulified_STAD1_block> GNE_threshold_percetage)
  Use average of all qualified STAD1 as final GNE
else if((percentage_qulified_STAD2_block > GNE_threshold_percentage)
  use average of all qualified STAD2 as final GNE
else
  use spatial noise metric as GNE
```

It should be noted that the temporal noise estimation provides two levels of thresholds instead of one as described with process 700 above, where each level could have a different temporal noise estimation level to increase accuracy.

EXPERIMENTATION

The experimental comparison condition is provided by system 400 (FIG. 4) as the conventional system and system 500 (FIG. 5) as the disclosed content-adaptive system herein. System 400 only derives filter strengths based on an encoder's parameter (such as QP) but for the experiments, does not use conventional noise estimation in the denoising operations. System 500 has the disclosed GNE mechanism that derives content-adaptively strengths as described above. Encoding statistics were collected for over 90 videos as presented below on Table 1, where the benefit of bit-rate savings from the present system and method are revealed, and especially for noisy video.

Table 1 below shows an average bit rate saving (%) over the 90 videos from an encoder pre-processor with the two different design configurations of system 400 ((a) on the table) and system 500 ((b) on the table) (values are rounded). It will be noted that the content-adaptive system herein had significantly better bitrate savings except for two instances (55 clips plus QP 27 and 32).

that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein. As mentioned previously, in another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implemen-

| | Quantization Parameter (QP) | | | | | | | | | |
|---|---|---|---|---|---|---|---|---|---|---|
| | 18 | | 22 | | 27 Config. | | 32 | | 37 | |
| | (a) | (b) | (a) | (b) | (a) | (b) | (a) | (b) | (a) | (b) |
| Ave. Bitrate savings (%) 90 clips | 13.8 | 18.9 | 10.4 | 16.6 | 7.6 | 12.5 | 5.0 | 8.9 | 2.5 | 7.3 |
| Ave. Bitrate savings (%) non-noisy (55 clips) | 13.8 | 15.1 | 6.2 | 6.4 | 3.3 | 3.2 | 2.4 | 2.2 | 1.3 | 1.8 |
| Ave. Bitrate savings (%) non-noisy (35 clips) | 13.7 | 25.0 | 17.0 | 32.6 | 14.3 | 27.1 | 9.2 | 19.5 | 4.3 | 15.8 |

While implementation of example processes 600, 700, and 800 may include the undertaking of all operations shown in the order illustrated, the present disclosure is not limited in this regard and, in various examples, implementation of any of the processes herein may include the undertaking of only a subset of the operations shown and/or in a different order than illustrated.

In implementations, features described herein may be undertaken in response to instructions provided by one or more computer program products. Such program products may include signal bearing media providing instructions tation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

As used in any implementation described herein, the term "logic unit" refers to any combination of firmware logic and/or hardware logic configured to provide the functionality described herein. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the coding systems discussed herein. One of ordinary skill in the art will appreciate that operations performed by hardware and/or firmware may alternatively be implemented via software, which may be embodied as a software package, code and/or instruction set or instructions, and also appreciate that logic unit may also utilize a portion of software to implement its functionality.

As used in any implementation described herein, the term "component" may refer to a module or to a logic unit, as these terms are described above. Accordingly, the term "component" may refer to any combination of software logic, firmware logic, and/or hardware logic configured to provide the functionality described herein. For example, one of ordinary skill in the art will appreciate that operations performed by hardware and/or firmware may alternatively be implemented via a software module, which may be embodied as a software package, code and/or instruction set, and also appreciate that a logic unit may also utilize a portion of software to implement its functionality.

Figure 9:
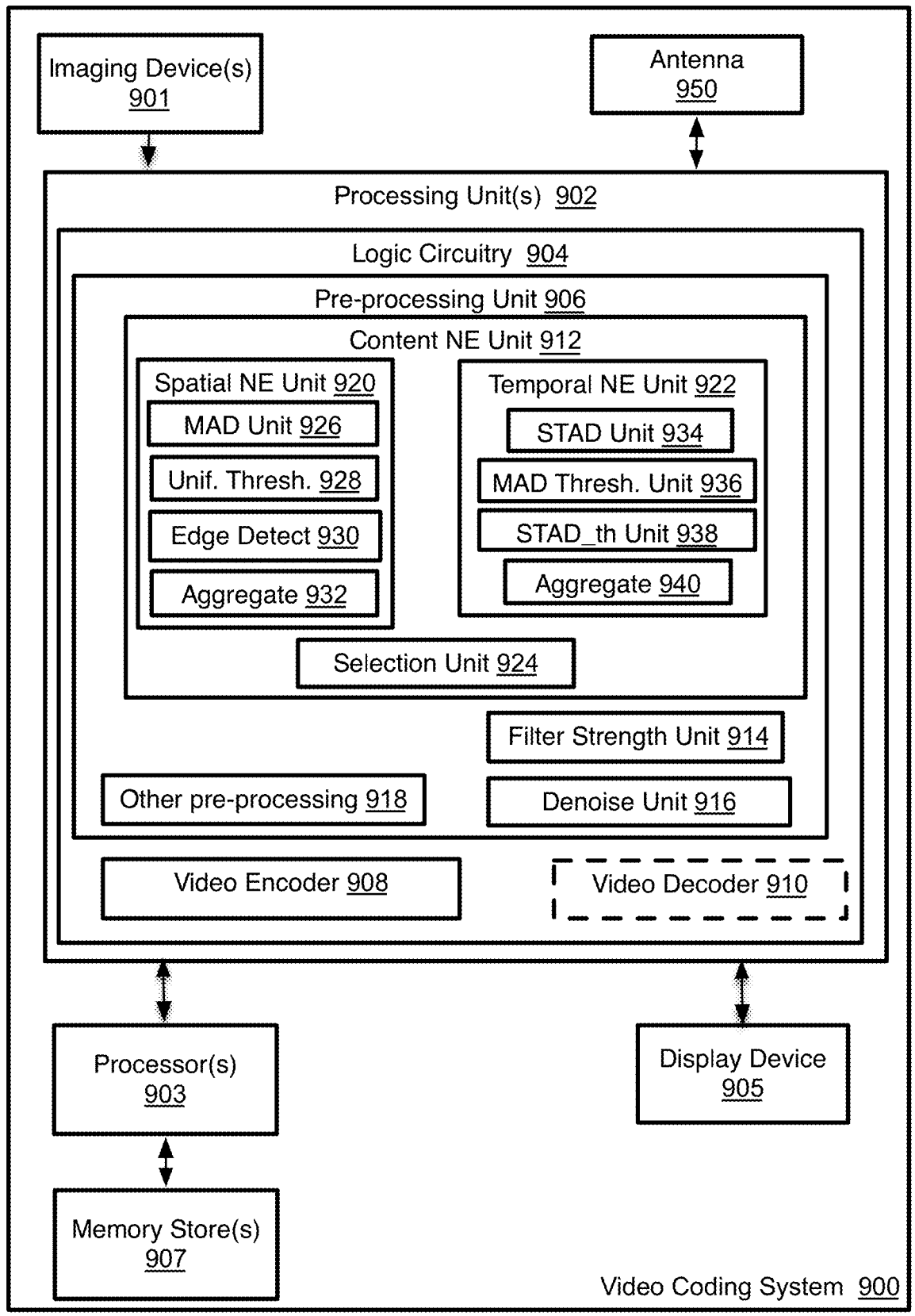
FIG. 9 is an illustrative diagram of an example system.

Referring to FIG. 9, an example video coding system 900 for providing content-adaptive denoising for video coding may be arranged in accordance with at least some implementations of the present disclosure. In the illustrated implementation, system 900 may include imaging device(s) 901 such as one or more cameras, one or more central and/or graphics processing units or processors 903, a display device 905, one or more memory stores 907, an antenna 950 for wireless transmission, and processing unit(s) 902 to perform the operations mentioned above. Processor(s) 903, memory store 907, and/or display device 905 may be capable of communication with one another, via, for example, a bus, wires, or other access. In various implementations, display device 905 may be integrated in system 900 or implemented separately from system 900.

As shown in FIG. 9, the processing unit(s) 902 may have logic circuitry 904 with a pre-processing unit 906 and either a video encoder unit 908 alone or with a video decoder unit 910. The pre-processing unit 906 may receive image data for encoding and may have a content noise estimation (NE) unit 912 to generate noise estimates as described above, a filter strength unit 914 that receives the noise estimates to adjust the filter strength, and a denoising unit 916 that uses the filter strength to perform the denoising. Other pre-processing units 918 may be provided as well. The content NE unit 912 may have a spatial NE unit 920 with a MAD unit 926, a uniform threshold unit 928, an edge detection unit 930 and an aggregate unit 932. Also, a temporal NE unit 922 has a STAD unit 934, a MAD threshold unit 936, a STAD_th unit 938, and an aggregate unit 940. A selection unit 924 is provided to select between temporal and spatial noise estimations. All of these units, logic, and/or modules perform the tasks as mentioned above and as the name of the unit implies.

As will be appreciated, the modules illustrated in FIG. 9 may include a variety of software and/or hardware modules, and/or modules that may be implemented via software or hardware or combinations thereof. For example, the modules may be implemented as software via processing units 902 or the modules may be implemented via a dedicated hardware portion. Furthermore, the shown memory stores 907 may be shared memory for processing units 902, for example, storing any pre-processing and denoising data, whether stored on any of the options mentioned above, or may be stored on a combination of these options, or may be stored elsewhere. Also, system 900 may be implemented in a variety of ways. For example, system 900 (excluding display device 905) may be implemented as a single chip or device having a graphics processor unit (GPU), an image signal processor (ISP), a quad-core central processing unit, and/or a memory controller input/output (I/O) module. In other examples, system 900 (again excluding display device 905) may be implemented as a chipset or as a system on a chip (SoC).

Processor(s) 903 may include any suitable implementation including, for example, microprocessor(s), multicore processors, application specific integrated circuits, chip(s), chipsets, programmable logic devices, graphics cards, integrated graphics, general purpose graphics processing unit(s), or the like. In addition, memory stores 907 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 907 also may be implemented via cache memory.

Figure 10:
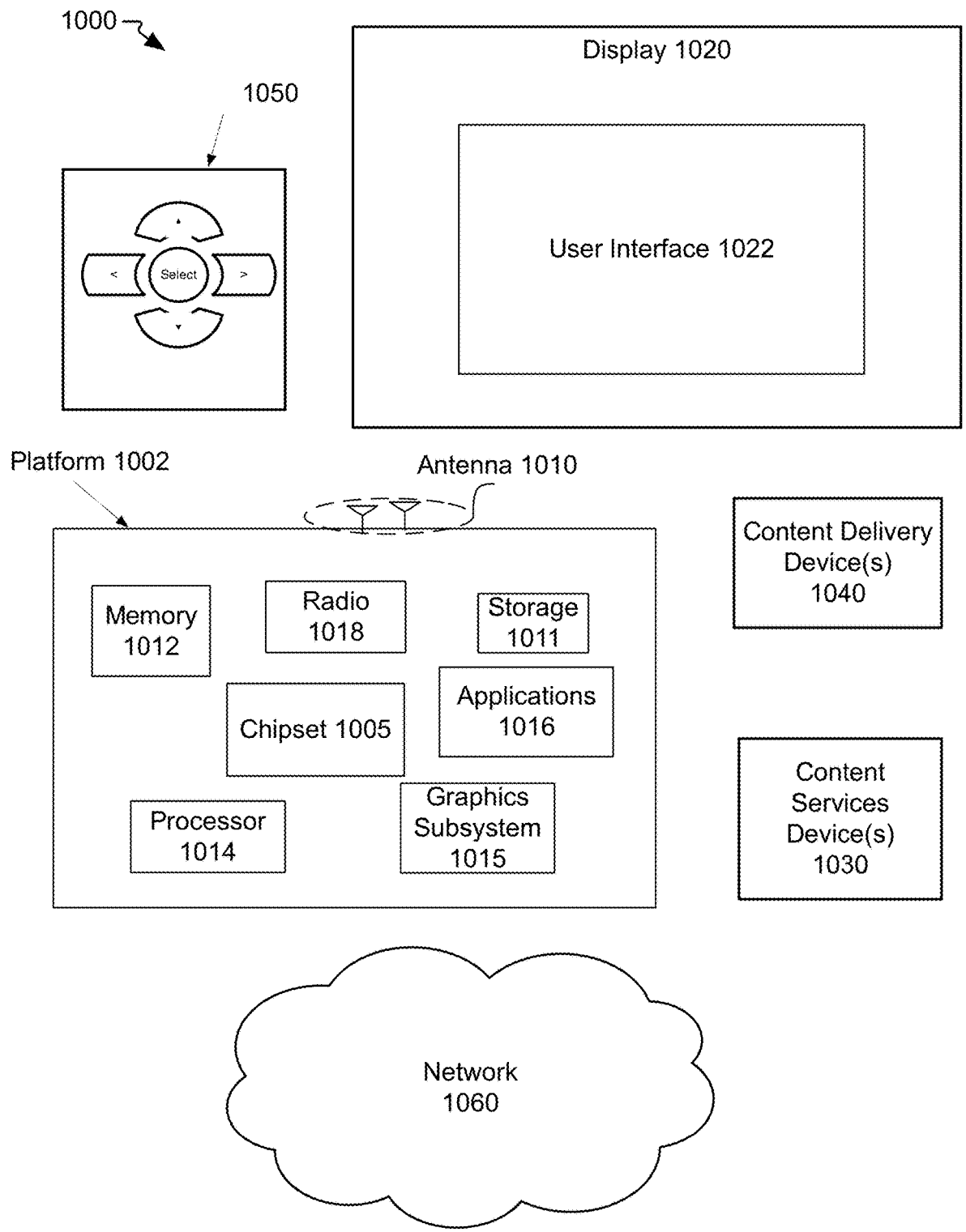
FIG. 10 is an illustrative diagram of another example system.

Referring to FIG. 10, an example system 1000 in accordance with the present disclosure and various implementations, may be a media system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 1000 includes a platform 1002 communicatively coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, antenna 1010, memory 1012, storage 1011, graphics subsystem 1015, applications 1016 and/or radio 1018 as well as antenna(s) 1010. Chipset 1005 may provide intercommunication among processor 1014, memory 1012, storage 1011, graphics subsystem 1015, applications 1016 and/or radio 1018. For example, chipset 1005 may include a storage adapter (not depicted) capable of providing intercommunication with storage 1011.

Processor 1014 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 1014 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1011 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1011 may include technology to increase the storage performance enhanced protection for valuable digital media when multiple hard drives are included, for example.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, Display Port, wireless HDMI, and/or wireless HD compliant techniques. Graphics subsystem 1015 may be integrated into processor 1014 or chipset 1005. In some implementations, graphics subsystem 1015 may be a stand-alone card communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other implementations, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of unidirectionally or bidirectionally communicating content between content providers and platform 1002 and/display 1020, via network 1060 or directly. It will be appreciated that the content may be communicated unidirectionally and/or bidirectionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of controller 1050 may be used to interact with user interface 1022, for example. In implementations, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In implementations, controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 7.1 surround sound audio and/or high definition (7.1) surround sound audio, for example. Drivers may include a graphics driver for integrated graphics platforms. In implementations, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various implementations, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various implementations, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The implementations, however, are not limited to the elements or in the context shown or described in FIG. 10.

Figure 11:
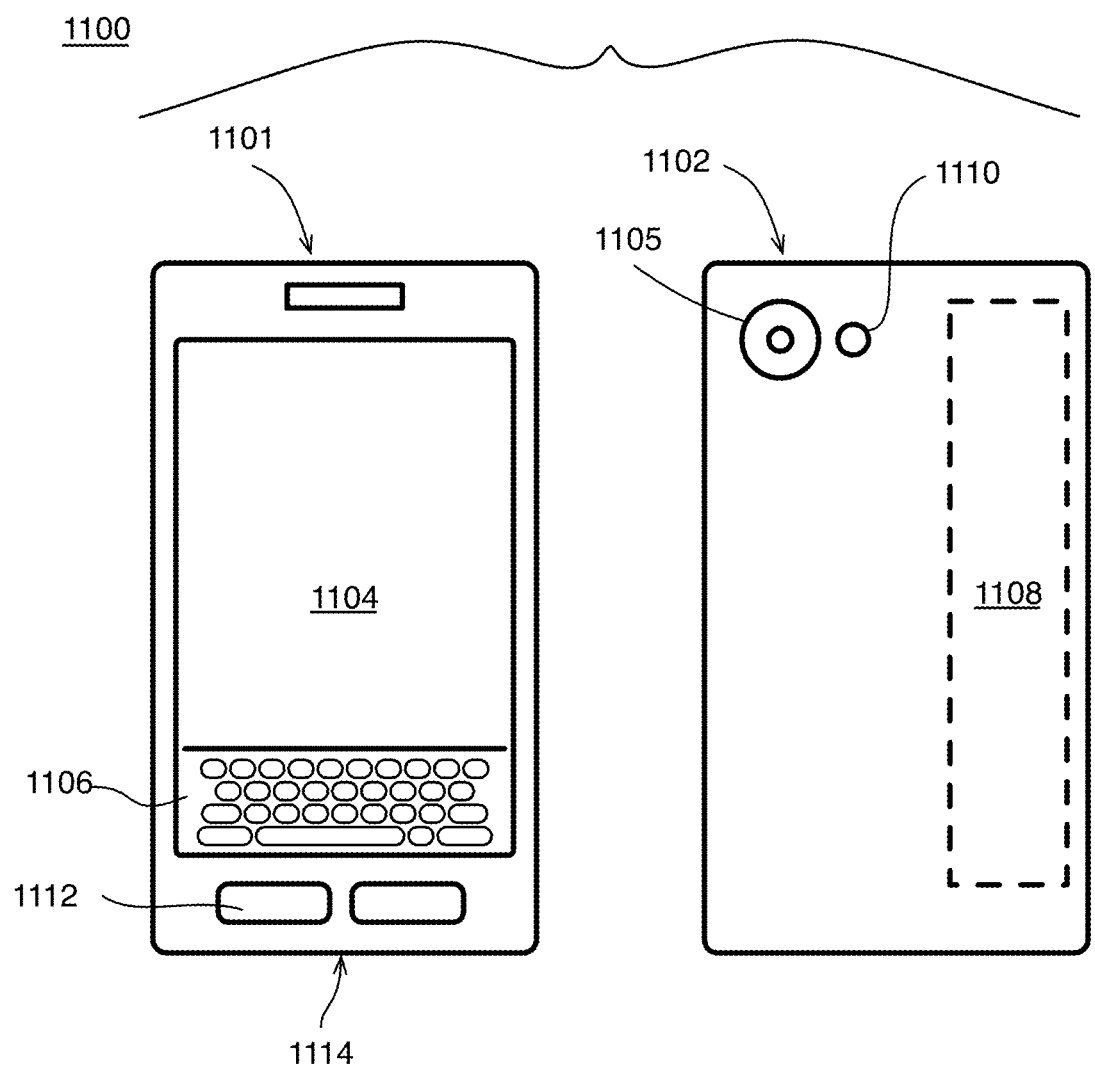
FIG. 11 illustrates another example device, all arranged in accordance with at least some implementations of the present disclosure.

Referring to FIG. 11, a small form factor device 1100 is one example of the varying physical styles or form factors in which systems 900 or 1000 may be embodied. By this approach, device 1100 may be implemented as a mobile computing device having wireless capabilities. A mobile computing device may refer to any device having a processing system and a mobile power source or supply, such as one or more batteries, for example.

As described above, examples of a mobile computing device may include a digital still camera, digital video camera, mobile devices with camera or video functions such as imaging phones, webcam, personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various implementations, for example, a mobile computing device may be implemented as a smart phone capable of executing computer applications, as well as voice communications and/or data communications. Although some implementations may be described with a mobile computing device implemented as a smart phone by way of example, it may be appreciated that other implementations may be implemented using other wireless mobile computing devices as well. The implementations are not limited in this context.

As shown in FIG. 11, device 1100 may include a housing with a front 1101 and a back 1102. Device 1100 includes a display 1104, an input/output (I/O) device 1106, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone 1114, or may be digitized by a voice recognition device. As shown, device 1100 may include a camera 1105 (e.g., including at least one lens, aperture, and imaging sensor) and a flash 1110 integrated into back 1102 (or elsewhere) of device 1100. The implementations are not limited in this context.

Various forms of the devices and processes described herein may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an implementation is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects described above may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional implementations.

By an example one or more first implementations, a computer-implemented method of video coding, comprises obtaining image data of frames of a video sequence; determining a spatial noise estimation for a current frame based on uniform blocks of pixels found to have a uniformity in image data that meets one or more uniformity criteria; determining a temporal noise estimation for the current frame at least partly based on image data differences between the uniform blocks and blocks on another frame; and providing either the temporal noise estimation or the spatial noise estimation depending on at least one threshold and to adjust denoising filter strength to pre-process the current frame before encoding the current frame.

By one or more second implementation, and further to the first implementation, wherein determining a spatial noise estimation comprises using a median image data value of a neighborhood of pixels around each pixel forming a candidate uniform block.

By one or more third implementations, and further to the first or second implementation, wherein determining a spatial noise estimation comprises: for each block pixel in a block of the current frame: determine a difference between a median of the image data values within a neighborhood window including the block pixel and the image data value of each neighborhood pixel within the neighborhood window; sum the differences for the individual neighborhood window pixels to provide a sum for the block pixel; and generate a block average or other combination of the sums of the block pixels of a block, and repeated for each block in a frame; and compute a frame average by averaging the block averages to generate a frame spatial noise estimate.

By one or more fourth implementations, and further to any of the first to third implementation, wherein determining the spatial noise estimation comprises only including those blocks with all pixel values within upper and lower uniformity boundaries.

By one or more fifth implementations, and further to any of the first to fourth implementation, wherein determining the spatial noise estimation comprises determining if a block has an object edge within content of the image data in the block, and only using blocks to determine the spatial noise estimation that do not have an edge within the block's content.

By one or more sixth implementations, and further to any of the first to fifth implementation, wherein determining a temporal noise estimation comprising determining whether individual ones of the uniform blocks have a spatial representative value that falls within a temporal threshold range to determine whether one of the uniform blocks should be used to generate the temporal noise estimation.

By one or more seventh implementations, and further to the sixth implementation, wherein the spatial representative value is a median absolute deviation sum.

By one or more eighth implementations, and further to any of the first to seventh implementation, wherein determining a temporal noise estimation comprises generating a sum of temporal absolute difference (STAD) between pixels of individual uniform blocks and corresponding pixels of blocks of the another frame.

By one or more ninth implementations, and further to the eighth implementation, the method comprising comparing the STAD of individual uniform blocks to an adaptive threshold that changes depending on the image content of a previous frame.

By one or more tenth implementations, and further to the ninth implementation, wherein the adaptive threshold changes depending on a noise estimation of the previous frame.

By one or more eleventh implementations, and further to the ninth implementation, wherein the adaptive threshold factors a motion detection threshold of a previous frame.

By an example twelfth implementation, a computer-implemented system comprises memory to store image data of at least one image; and at least one processor communicatively coupled to the memory, and the at least one processor being arranged to operate by: obtaining image data of frames of a video sequence; determining a spatial noise estimation for a current frame based on uniform blocks of pixels found to have a uniformity in image data that meets one or more uniformity criteria; determining a temporal noise estimation for the current frame at least partly based on image data differences between the uniform blocks and blocks on another frame; and providing either the temporal noise estimation or the spatial noise estimation depending on at least one threshold and to adjust denoising filter strength to pre-process the current frame before encoding the current frame.

By one or more thirteenth implementations, and further to the twelfth implementation, wherein determining a spatial noise estimation comprises using a median image data value of a neighborhood of pixels around each pixel forming a candidate uniform block.

By one or more fourteenth implementations, and further to the twelfth or thirteenth implementation, wherein determining a spatial noise estimation comprises: for each block pixel in a block of the current frame: determine a difference between a median of the image data values within a neighborhood window including the block pixel and the image data value of each neighborhood pixel within the neighborhood window; sum the differences for the individual neighborhood window pixels to provide a sum for the block pixel; and generate a block average or other combination of the sums of the block pixels of a block, and repeated for each block in a frame; and compute a frame average by averaging the block averages to generate a frame spatial noise estimate.

By one or more fifteenth implementations, and further to any one of the thirteenth to fourteenth implementation, wherein determining a temporal noise estimation comprises generating a sum of temporal absolute difference (STAD) between pixels of individual uniform blocks and corresponding pixels of the blocks of the another frame.

By one or more sixteenth implementations, and further to any of twelfth to the fifteenth implementation, wherein determining a temporal noise estimation comprises generating a sum of temporal absolute difference (STAD) between pixels of individual uniform blocks and corresponding pixels of the blocks of the another frame.

By one or more seventeenth implementations, and further to the sixteenth implementation, wherein the method comprising comparing the STAD of individual uniform blocks to an adaptive motion detection threshold that is a weighted-average of a previous-frame's adaptive motion detection threshold and a previous-frame's estimated noise level.

By one or more eighteenth implementations, and further to the seventeenth implementation, wherein the previous frame's estimated noise level used to compute the adaptive motion detection threshold is arranged to be either a spatial noise estimation or a temporal noise estimation.

By one or more nineteenth implementations, at least one non-transitory computer-readable medium having stored instructions thereon that when executed cause a computing device to operate by obtaining image data of frames of a video sequence; determining a spatial noise estimation for a current frame based on uniform blocks of pixels found to have a uniformity in image data that meets one or more uniformity criteria; determining a temporal noise estimation for the current frame at least partly based on image data differences between the uniform blocks and blocks on another frame; and providing either the temporal noise estimation or the spatial noise estimation depending on at least one threshold and to adjust denoising filter strength to pre-process the current frame before encoding the current frame.

By one or more twentieth implementations, and further to the nineteenth implementation, wherein determining a spatial noise estimation comprises using a median image data value of a neighborhood of pixels around each pixel forming a candidate uniform block.

By one or more twenty-first implementations, and further to the nineteenth or twentieth implementation, wherein the spatial noise estimation is an average of per block average median absolute deviation sums of the uniform blocks.

By one or more twenty-second implementations, and further to the twenty-first implementation, wherein determining a temporal noise estimation comprises comparing the STAD of individual uniform blocks to an adaptive threshold that changes at least depending on the noise estimation of a previous frame.

By one or more twenty-third implementations, and further to the twenty-first implementation, wherein determining a temporal noise estimation comprises using an average STAD of the uniform blocks in the current frame as the frame temporal noise estimation of the current frame.

By one or more twenty-fourth implementations, and further to any one of the nineteenth to twenty-third implementation, wherein the instructions cause the computing device to operate by determining whether to use the temporal noise estimation or the spatial noise estimation to adjust a denoising filter strength at least depending on whether a percentage of the number of uniform blocks of the current frame that meet one or more spatial criteria and one or more temporal criteria relative to the number of all blocks of the current frame is greater than or less than a threshold percentage.

By one or more twenty-fifth implementations, and further to the twenty-fourth implementation, wherein the one or more spatial criteria comprises at least one uniformity criteria of: a median difference range threshold, a pixel value threshold, an edge detection determination, and a block average median absolute deviation (MAD) sum range threshold; and the one or more temporal criteria comprises at least a motion detection threshold that factors noise estimation and a previous motion detection threshold from another frame relative to the current frame.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, the above examples are not limited in this regard and, in various implementations, the above examples may include undertaking only a subset of such features, undertaking a different order of such features, undertaking a different combination of such features, and/or undertaking additional features than those features explicitly listed. For example, all features described with respect to any example methods herein may be implemented with respect to any example apparatus, example systems, and/or example articles, and vice versa.

What is claimed is:

1. A computer-implemented method of video coding, comprising:
    obtaining image data of frames of a video sequence;
    determining which blocks of a frame are uniform blocks wherein the individual uniform blocks each have pixel image data within the block that meets at least one uniformity criterion;
    determining a frame-level spatial noise estimation that is a value representing an entire current frame depending only on the uniform blocks rather than the non-uniform blocks;
    determining a temporal noise estimation for the current frame based on image data differences between the uniform blocks and blocks on another frame; and
    providing either the temporal noise estimation or the spatial noise estimation depending on at least one threshold and to adjust denoising filter strength to pre-process the current frame before encoding the current frame.

2. The method of claim 1 wherein determining a spatial noise estimation comprises using a median image data value of a neighborhood of pixels around each pixel forming a candidate uniform block.

3. The method of claim 1 wherein determining a spatial noise estimation comprises:
    for each block pixel in a block of the current frame:
        determine a difference between a median of the image data values within a neighborhood window including the block pixel and the image data value of each neighborhood pixel within the neighborhood window;
        sum the differences for the individual neighborhood window pixels to provide a sum for the block pixel; and
        generate a block average or other combination of the sums of the block pixels of a block, and repeated for each block in a frame; and
    compute a frame average by averaging the block averages to generate a frame spatial noise estimate.

4. The method of claim 1 wherein determining the spatial noise estimation comprises only including those blocks with all pixel values within upper and lower pixel uniformity boundaries.

5. The method of claim 1 wherein determining the spatial noise estimation comprises determining if a block has an object edge within content of the image data in the block, and only using blocks to determine the spatial noise estimation that do not have an edge within the block's content.

6. The method of claim 1 wherein determining a temporal noise estimation comprising determining whether individual ones of the uniform blocks have a spatial representative value that falls within a temporal threshold range to determine whether one of the uniform blocks should be used to generate the temporal noise estimation.

7. The method of claim 6 wherein the spatial representative value is a median absolute deviation sum.

8. The method of claim 1 wherein determining a temporal noise estimation comprises generating a sum of temporal absolute difference (STAD) between pixels of individual uniform blocks and corresponding pixels of blocks of the another frame.

9. The method of claim 8 comprising comparing the STAD of individual uniform blocks to an adaptive threshold that changes depending on the image content of a previous frame.

10. The method of claim 9 wherein the adaptive threshold changes depending on a noise estimation of the previous frame.

11. The method of claim 9 wherein the adaptive threshold factors a motion detection threshold of a previous frame.

12. A computer-implemented system comprising:
memory to store image data of at least one image; and
at least one processor communicatively coupled to the memory, and the at least one processor being arranged to operate by:
obtaining image data of frames of a video sequence;
determining which blocks of a frame are uniform blocks wherein the individual uniform blocks each have pixel image data within the block that meets at least one uniformity criterion;
determining a frame-level spatial noise estimation that is a value representing an entire current frame depending only on the uniform blocks rather than the non-uniform blocks;
determining a temporal noise estimation for the current frame based on image data differences between the uniform blocks and blocks on another frame; and
providing either the temporal noise estimation or the spatial noise estimation depending on at least one threshold and to adjust denoising filter strength to pre-process the current frame before encoding the current frame.

13. The system of claim 12 wherein determining a spatial noise estimation comprises using a median image data value of a neighborhood of pixels around each pixel forming a candidate uniform block.

14. The system of claim 12 wherein determining a spatial noise estimation comprises:
for each block pixel in a block of the current frame:
determine a difference between a median of the image data values within a neighborhood window including the block pixel and the image data value of each neighborhood pixel within the neighborhood window;
sum the differences for the individual neighborhood window pixels to provide a sum for the block pixel; and
generate a block average or other combination of the sums of the block pixels of a block, and repeated for each block in a frame; and
compute a frame average by averaging the block averages to generate a frame spatial noise estimate.

15. The system of claim 12 wherein determining the spatial noise estimation comprises determining if a block has an object edge within content of the image data in the block, and only using blocks to determine the spatial noise estimation that do not have an edge within the block's content.

16. The system of claim 12 wherein determining a temporal noise estimation comprises generating a sum of temporal absolute difference (STAD) between pixels of individual uniform blocks and corresponding pixels of the blocks of the another frame.

17. The system of claim 16 comprising comparing the STAD of individual uniform blocks to an adaptive motion detection threshold that is a weighted-average of a previous-frame's adaptive motion detection threshold and a previous-frame's estimated noise level.

18. The system of claim 17 wherein the previous frame's estimated noise level used to compute the adaptive motion detection threshold is arranged to be either a spatial noise estimation or a temporal noise estimation.

19. At least one non-transitory computer-readable medium having stored thereon instructions that when executed cause a computing device to operate by:
obtaining image data of frames of a video sequence;
determining which blocks of a frame are uniform blocks wherein the individual uniform blocks each have pixel image data within the block that meets at least one uniformity criterion;
determining a frame-level spatial noise estimation that is a value representing an entire current frame depending only on the uniform blocks rather than the non-uniform blocks;
determining a temporal noise estimation for the current frame based on image data differences between the uniform blocks and blocks on another frame; and
providing either the temporal noise estimation or the spatial noise estimation depending on at least one threshold and to adjust denoising filter strength to pre-process the current frame before encoding the current frame.

20. The non-transitory computer-readable medium of claim 19 wherein determining a spatial noise estimation comprises using a median image data value of a neighborhood of pixels around each pixel forming a candidate uniform block.

21. The non-transitory computer-readable medium of claim 19 wherein determining a temporal noise estimation comprises generating a sum of temporal absolute difference (STAD) between pixels of individual uniform blocks and corresponding pixels of the another frame.

22. The non-transitory computer-readable medium of claim 21 wherein determining a temporal noise estimation comprises comparing the STAD of individual uniform blocks to an adaptive threshold that changes at least depending on the noise estimation of a previous frame.

23. The non-transitory computer-readable medium of claim 21 wherein determining a temporal noise estimation comprises using an average STAD of the uniform blocks in the current frame as the frame temporal noise estimation of the current frame.

24. The non-transitory computer-readable medium of claim 19 wherein the instructions cause the computing device to operate by determining whether to use the temporal noise estimation or the spatial noise estimation to adjust a denoising filter strength at least depending on whether a percentage of the number of uniform blocks of the current frame that meet one or more spatial criteria and one or more temporal criteria relative to the number of all blocks of the current frame is greater than or less than a threshold percentage.

25. The non-transitory computer-readable medium of claim 24 wherein the one or more spatial criteria comprises at least one uniformity criteria of:
a median difference range threshold,
a pixel value threshold,
an edge detection determination, and
a block average median absolute deviation (MAD) sum range threshold; and the one or more temporal criteria comprises at least a motion detection threshold that factors noise estimation and a previous motion detection threshold from another frame relative to the current frame.

* * * * *